March 4, 1930. L. W. NORTHFIELD ET AL 1,749,599
SCALE PLATFORM CLEARER
Filed Dec. 19, 1927
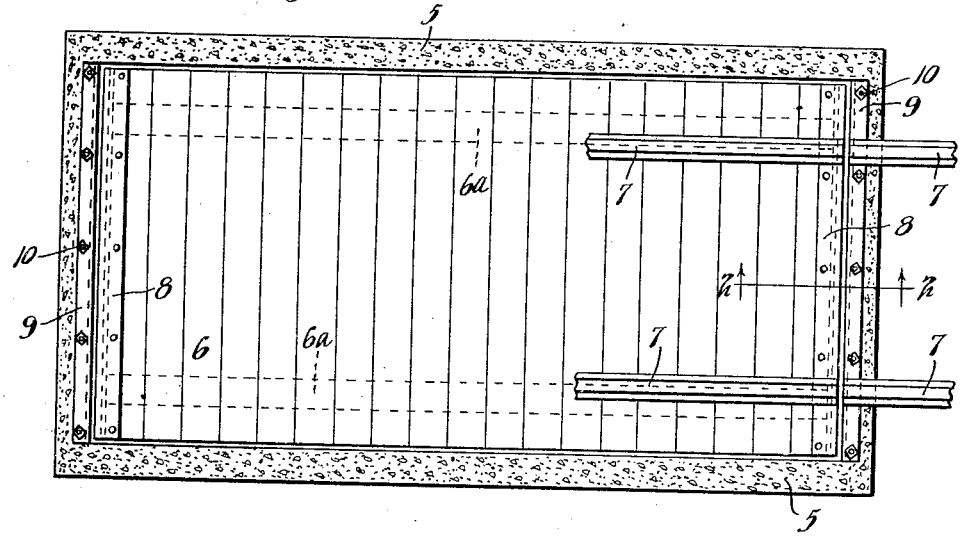
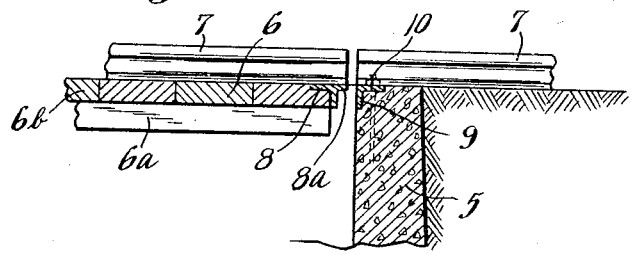
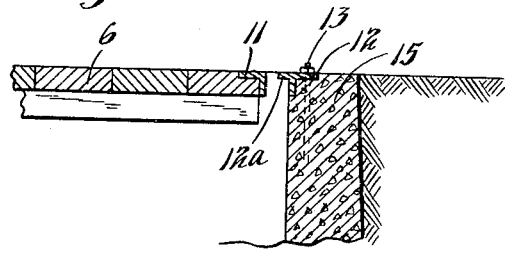
INVENTORS
LUKE W. NORTHFIELD.
WESLEY A. NORTHFIELD.
GLENN H. NORTHFIELD.
BY THEIR ATTORNEYS.

Patented Mar. 4, 1930

1,749,599

UNITED STATES PATENT OFFICE

LUKE W. NORTHFIELD, WESLEY A. NORTHFIELD, AND GLENN H. NORTHFIELD, OF MINNEAPOLIS, MINNESOTA

SCALE-PLATFORM CLEARER

Application filed December 19, 1927. Serial No. 241,244.

This invention relates to a scale construction, and particularly to a construction adapted to clear obstructions between the scale platform and frame. In scales of the platform type which are used to weigh various materials such as that carried in wagons and cars, there is a space between the movable platform and the frame which also often becomes clogged by material dropping about the scale. Such material getting in between the platform and frame interferes with the proper functioning the scale.

It is an object of this invention, therefore, to provide a simple and efficient means, particularly at the ends of the scales, which will effectively remove any material getting in between the platform and frame in the normal operation of the scale.

It is more specifically an object of the invention to provide a simple and efficient means comprising a member secured to either the platform or scale frame having a projecting and comparatively thin edge adapted to cut through any obstruction so as to remove the same from the space between the platform and scale, in the movements of the platform.

These and other objects and advantages of the invention will be fully set forth in the following description made in connection with the accompanying drawings, in which like reference characters refer to similar parts throughout the several views and in which:—

Fig. 1 is a plan view of the scale having the invention applied thereto;

Fig. 2 is a vertical section taken on line 2—2 of Fig. 1 as indicated by the arrows; and Fig. 3 is a view similar to Fig. 2, showing a modification.

Referring to the drawings, in Fig. 1 a portion of the scale construction is shown, comprising the frame 5 extending about and spaced slightly from the edge of the platform 6, adapted to receive the load to be weighed. The frame 5 as shown comprises a wall surrounding a pit, at the top of which platform 6 is disposed, which pit is adapted to receive the weighing and platform supporting mechanism not shown. The material to be weighed can be placed on the platform 6 in any manner, and as is well known, is often drawn thereon in wagons or cars. In scales adapted to weigh material in cars, tracks are usually provided and such car track is shown in Fig. 1, having the rails 7, a portion of which is shown on the platform 6. The platform 6 is shown as comprising timbers 6ª extending longitudinally, to which are secured the cross planks or timbers 6ᵇ. While the frame 5 may be made of any desired material, in the embodiment of the invention illustrated it is shown as comprising a concrete or masonry frame.

In accordance with the present invention, a member 8 is secured to the platform 6 extending along the edge thereof, and while this member may be variously formed, in the embodiment of the invention illustrated it is shown as of angular form, having a projecting side 8ª with a terminal and comparatively thin edge. The member 8 is substantially of T-shape having one side extending along the edge of the platform portion 6ᵇ and having its top substantially flush with the top of said platform, one arm or side extending over the top edge of said platform. While the member 8 can be placed along any edge of the platform, it preferably, and in the embodiment of the invention illustrated is shown as disposed at each end of the platform 6. The frame 5 has a member 9 secured thereto, and while this member may be variously formed, it preferably has a side extending along the inner side of the frame and is secured by any suitable means, such as the bolts 10. In the embodiment of the invention illustrated, the member 9 is shown as an angle bar, the sides of which are substantially flush with the top and sides of the frame.

When a wagon, car or other vehicle is moved onto the platform 6, there is a longitudinal movement of said platform. When the vehicle is drawn off the platform, owing to the friction of the wheels on the platform, the latter is drawn longitudinally, and when the vehicle is off the platform, the platform swings back to its normal position. Should any material such as coal, pieces of ice or snow, drop into the space between the edge of the platform and frame and be retained between member 8 and the side of the frame, such material will be cut by the edge of the portion 8ᵃ of the member 8 in the longitudinal movement of the platform, so that when the platform assumes its normal position, such obstruction will be removed and will drop into the space beneath the platform. The momentum of the platform 6 is considerable and with the load to be weighed thereon, there is a large force placed on the material engaged between the members 8 and 9.

In the modification shown in Fig. 3, the platform 6 has an angle member 11 extending along the ends thereof, one side of which is set into the top of the platform so as to be flush with the top thereof and the other side of which extends downward along the edge of the platform. The frame member 5 has a member 12 extending along its end edge, which member is substantially of the shape of member 8, said member having its top substantially flush with the top of frame 5 and being secured thereto by any suitable means, such as the headed and nutted bolts 13. The member 12 has a projecting side 12ᵃ having a free terminal edge which is quite narrow, directed inward toward the member 11.

In the operation of the form shown in Fig. 3, any obstructions which lodge between the members 11 and 12 will be cut and crushed so as to be released when platform 11 moves toward the frame 5.

From the above description it is seen that applicant has provided a very simple and efficient clearing means for a scale comprising a frame and movable platform. The edge of the member which projects from the platform or frame is quite thin so that it will readily cut through the obstruction and permit the same to drop into the wider space below. The space between the platform and scale frame is thus kept clear. Applicant's device is very simple in construction, the same has been amply demonstrated in actual practice and found to be very successful.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. A platform scale for weighing matter in vehicles having in combination, a frame over which vehicles are adapted to pass, said frame having a rectangular opening therein, a rigid platform shaped similarly to and disposed in said opening and of smaller dimensions than said opening and constructed and arranged to have vehicles move thereon from said frame and to support said vehicles, the top of said platform being substantially flush with the top of said frame, a metal member secured to one of said parts and having a horizontal side with the thin edge projecting toward the other part, said other part having a metal member secured thereto having a vertical surface opposite said edge whereby in the relative movement of said frame and platform caused by vehicles moving thereon any obstruction caught between said metal members will be cut or crushed and will drop below said edge whereby the space between said metal members will be cleared.

2. A scale construction having in combination, a platform having longitudinal movement, a frame surrounding said platform and spaced from the edge thereof, a metal bar secured to the end of said platform having a side projecting outwardly substantially at the top of said patform, said side having a terminal narrow edge projecting toward said frame, a metal bar secured in said frame having a surface opposite said edge whereby said edge will cut through any material which may lodge between said bars. and said material will be cleared from the space between the edge of said platform and said frame.

3. A platform scale construction having in combination, a frame having a substantially vertical inner side and comprising a wall surrounding a rectangular pit, a track on said frame, a rigid rectangular platform disposed within said frame at the top of said pit and slightly spaced from said frame at the sides and ends, said platform being movable endwise in said frame, a track upon said platform aligned with said first mentioned track, a metal member secured to the end of said platform and having a horizontal projecting flange of comparatively small dimension at the top of said platform, said frame having a metal surface thereon in alignment with said flange whereby any obstruction being located in the space between said flange and frame will be cut and released in the relative movement of said frame and platform.

In testimony whereof we affix our signatures.

LUKE W. NORTHFIELD.
WESLEY A. NORTHFIELD.
GLENN H. NORTHFIELD.